(12) United States Patent
Lewallen, Jr. et al.

(10) Patent No.: US 10,530,879 B2
(45) Date of Patent: Jan. 7, 2020

(54) INTERACTIVE NOTIFICATION PANELS IN A COMPUTING SYSTEM

(71) Applicant: Microsoft Technology Licensing, LLC, Redmond, WA (US)

(72) Inventors: James Henry Lewallen, Jr., Fall City, WA (US); Christopher Lee Mullins, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 121 days.

(21) Appl. No.: 15/710,746

(22) Filed: Sep. 20, 2017

(65) Prior Publication Data

US 2019/0089796 A1    Mar. 21, 2019

(51) Int. Cl.
| | |
|---|---|
| *G06F 15/16* | (2006.01) |
| *H04L 29/08* | (2006.01) |
| *G06F 3/0481* | (2013.01) |
| *G06F 9/54* | (2006.01) |

(52) U.S. Cl.
CPC ............ *H04L 67/26* (2013.01); *G06F 3/0481* (2013.01); *G06F 9/54* (2013.01)

(58) Field of Classification Search
CPC ............................. H04L 67/26; G06F 3/0481
USPC ......................................................... 709/203
See application file for complete search history.

(56) References Cited

U.S. PATENT DOCUMENTS

| | | | | |
|---|---|---|---|---|
| 9,986,376 | B1* | 5/2018 | Anima | H04W 4/029 |
| 2004/0088715 | A1* | 5/2004 | Korall | H04L 51/24 |
| | | | | 719/318 |
| 2013/0311925 | A1* | 11/2013 | Denker | G06F 3/013 |
| | | | | 715/771 |
| 2014/0187213 | A1* | 7/2014 | Shuster | H04W 4/023 |
| | | | | 455/414.1 |
| 2015/0172505 | A1* | 6/2015 | Park | H04N 1/00307 |
| | | | | 358/1.15 |
| 2016/0246492 | A1* | 8/2016 | Baldassari | H04M 1/7253 |
| 2017/0366621 | A1* | 12/2017 | Sagar | H04L 51/02 |
| 2018/0063675 | A1* | 3/2018 | Raghav | H04L 51/02 |
| 2018/0090135 | A1* | 3/2018 | Schlesinger | G10L 15/22 |
| 2019/0042185 | A1* | 2/2019 | Young | G06F 3/167 |

* cited by examiner

*Primary Examiner* — Brian Whipple
*Assistant Examiner* — Hannah S Wang

(57) ABSTRACT

Described herein are systems and methods for providing interactive notification panels to a user. A bot apparatus receives a notification from an application program and transforms the notification into one or more interactive notification panels configured to receive user inputs and/or to provide an output to at least one user input. Based on at least one user input, the bot apparatus transmits data to the application program, which causes the application program to perform one or more actions.

19 Claims, 11 Drawing Sheets

INTERACTIVE NOTIFICATION PANELS IN A COMPUTING SYSTEM

BACKGROUND

Many types of application programs provide notifications to users. Typically, the notifications are simple notifications that inform the user of an event that has happened or will happen in the future. For example, a calendar program provides notifications of upcoming meetings or appointments. However, if a user wants to modify the meeting proposal by including another attendee, by attaching an attachment, or by changing the time of the meeting, the user must launch the calendar program to perform the modification.

It is with respect to these and other general considerations that embodiments have been described. Also, although relatively specific problems have been discussed, it should be understood that the embodiments should not be limited to solving the specific problems identified in the background.

SUMMARY

Embodiments disclosed herein provide one or more interactive notification panels to a user. A bot apparatus receives a notification from an application program and transforms the notification into one or more interactive notification panels configured to receive user inputs and/or to provide an output to at least one user input. The notification produced by the application program may be a non-interactive notification panel or an indication (e.g., signal, data) that the application program intends to provide a notification panel to a user. Based on at least one user input, the bot apparatus transmits data to the application program, which causes the application program to perform one or more actions.

In a first aspect, a system includes one or more processing units and one or more storage devices. The storage device(s) store instructions that when executed by the one or more processing units, cause the system to perform a method. The method includes receiving, by a bot apparatus, a notification from an application program and transforming, by the bot apparatus, the notification into an interactive notification panel. The interactive notification panel is configured to receive one or more user inputs and provide one or more outputs. Based on at least one received user input, the bot apparatus transmits data to the application program.

In another aspect, a method includes receiving, by a bot apparatus, a notification from an application program and transforming, by the bot apparatus, the notification into a first interactive notification panel that is configured to receive a user input. The bot apparatus provides the first interactive notification panel to a client-computing device. Based on a received user input, a conversation is conducted using one or more additional interactive notification panels, where each of the one or more additional interactive notification panels is configured to provide an output or receive another user input. Based on at least one user input, the bot apparatus transmits data to the application program based on at least one user input.

In yet another aspect, a method includes receiving, by a bot apparatus, a notification from an application program and transforming, by the bot apparatus, the notification into an interactive notification panel. The bot apparatus provides the interactive notification panel to a client-computing device to present the interactive notification panel to a user via an output device. Based on the presentation of the interactive notification panel, a conversation is conducted between the user and the bot apparatus using the interactive notification panel. Based on the conversation, the bot apparatus transmits data to the application program.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures. The elements of the drawings are not necessarily to scale relative to each other. Identical reference numerals have been used, where possible, to designate identical features that are common to the figures.

DETAILED DESCRIPTION

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

Embodiments described herein provide one or more interactive notification panels to a user via a client-computing device. A bot apparatus receives a notification from an application program and transforms the notification into one or more interactive notification panels configured to receive user inputs and/or to provide an output to at least one user input. The notification produced by the application program can be a non-interactive notification panel or an indication (e.g., one or more signals, data) that the application program intends to provide a notification panel to a user. Based on at least one user input, the bot apparatus transmits data to the application program, which causes the application program to perform one or more actions.

The interactive notification panel(s) allows the user and the bot apparatus to conduct a conversation using the interactive notification panel(s). The user is not required to launch or interact with the application program. In some instances, interacting with the interactive notification panel(s) makes it easier for the user to modify data or perform an action that is associated with the application program. The operations of the bot apparatus extend the functionality of a notification panel, which in turn increases user efficiency. Additionally or alternatively, extending the functionality of the notification panel improves the user experience with a computing device.

The term "apparatus" is intended to be construed broadly to include hardware (e.g., electronic circuits, electronic components, processing units, etc.), software that is executable by a processing unit or computing device, and combinations thereof. For example, in some embodiments, an "apparatus" includes one or more computer-executable programs that is stored on one or more storage devices and executed by one or more computing devices. Each computing device can be, for example, a client-computing device or a server-computing device.

Figure 1:
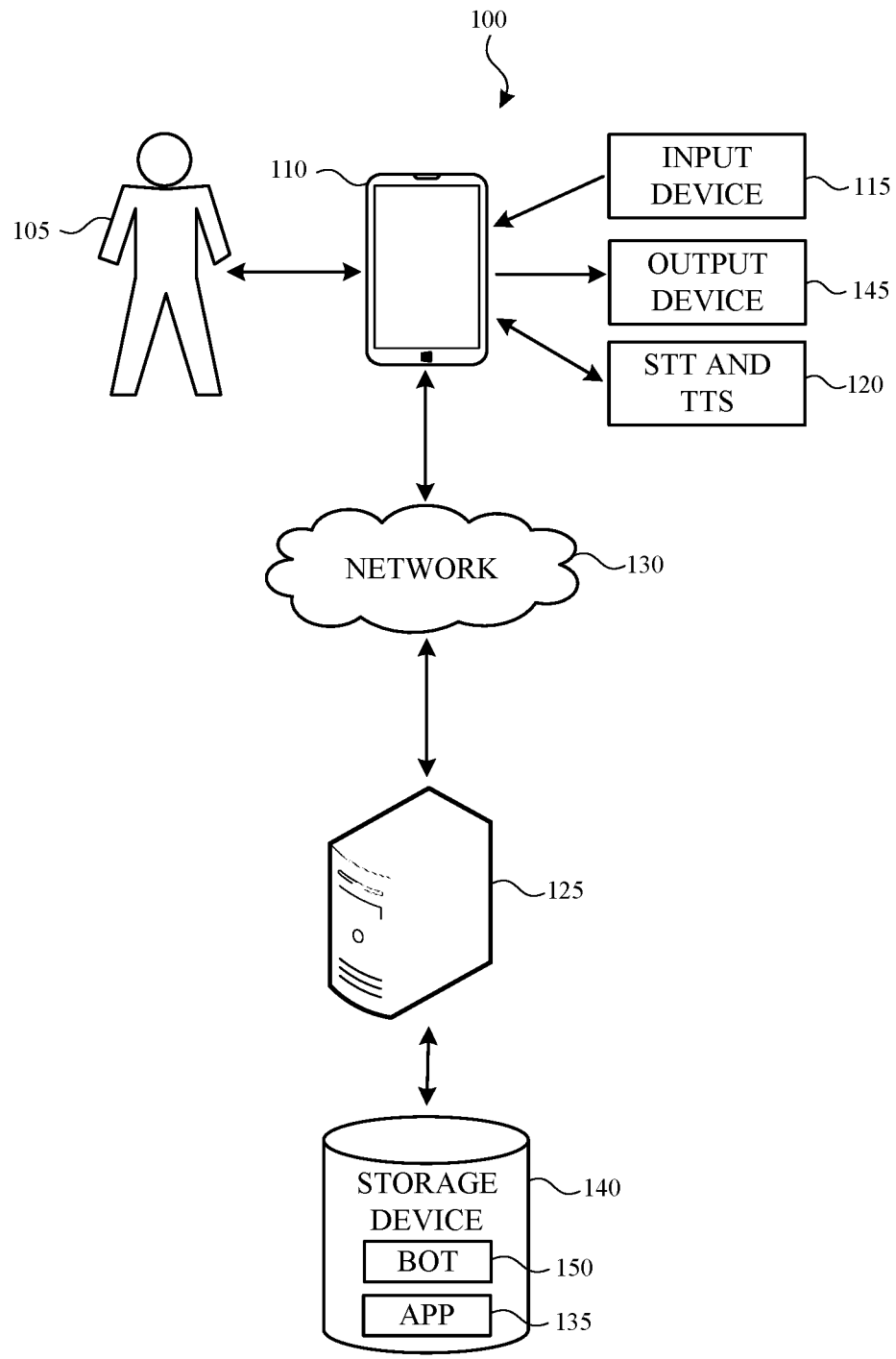
FIG. 1 illustrates an example system that can implement interactive notification panels using one or more bot apparatuses.

FIG. 1 illustrates an example system that can implement interactive notification panels using one or more bot apparatuses. The system 100 allows a user 105 to receive and interact with an interactive notification panel through a client-computing device 110. The client-computing device 110 may include, or be connected to, an input device 115 that receives the user inputs. Each user input can be submitted as a written or touch input (e.g., text, touch, gesture), as a spoken input (e.g., audio) that is converted to a text input (e.g., using a speech-to-text application (STT) 120), as a movement input, a motion-tracking input, or any other type of user input. The input device 115 may be any suitable type of input device or devices configured to receive the user inputs. In non-limiting examples, the input device 115 may be a keyboard (actual or virtual) and/or a microphone.

The client-computing device 110 is configured to access one or more server-computing devices (represented by server-computing device 125) through one or more networks (represented by network 130). The network 130 is illustrative of any suitable type of network, for example, an intranet and/or a distributed computing network (e.g., the Internet) over which the user 105 may communicate with other users and with other computing systems.

An application program (APP) 135 is stored on one or more storage devices (represented by storage device 140) and executed by the server-computing device 125. The user 105 can interact with the application program 135 through the client-computing device 110. The application program 135 provides, through the network 130, one or more notifications (e.g., a notification panel) to the client-computing device 110. Based on a received notification panel, the client-computing device 110 can provide the notification panel to any suitable output device 145 for presentation to the user 105. The output device 145 may be in, or connected to, the client-computing device 110. In non-limiting examples, the output device 145 is a display that displays the notification panel and/or a speaker that "speaks" the notification panel (e.g., using a text-to-speech application (TTS) 120).

A bot apparatus 150 is stored on the storage device 140 and executed by the server-computing device 125. In one non-limiting embodiment, the bot apparatus 150 performs a specific task, such as an automated or repetitive task. In another non-limiting embodiment, the bot apparatus 150 is an intelligent personal or virtual assistant, such as Cortana® by Microsoft Corporation. In the embodiments described herein, the bot apparatus 150 receives the notification panels from the application program 135 and interacts with the user 105 through one or more interactive notification panels that is based on the notification panel from the application program 135. The bot apparatus 150 transforms the original notification panel into an interactive notification panel that receives inputs from the user 105, provides outputs to the user 105, and causes the application program 135 to perform one or more actions based on at least one received input from the user 105.

In one or more embodiments, the client-computing device 110 is a personal or handheld computing device. For example, the client-computing device 110 may be one of: a mobile telephone; a smart phone; a tablet; a phablet; a smart watch; a wearable computer; a personal computer; a desktop computer; a laptop computer; a gaming device/computer (e.g., Xbox); a television; and the like. This list of example client-computing devices is for example purposes only and should not be considered as limiting. Any suitable client-computing device that interfaces with a bot apparatus may be utilized.

As should be appreciated, FIG. 1 is described for purposes of illustrating the present methods and systems and is not intended to limit the disclosure to a particular sequence of steps or a particular combination of hardware or software components.

Figure 2:
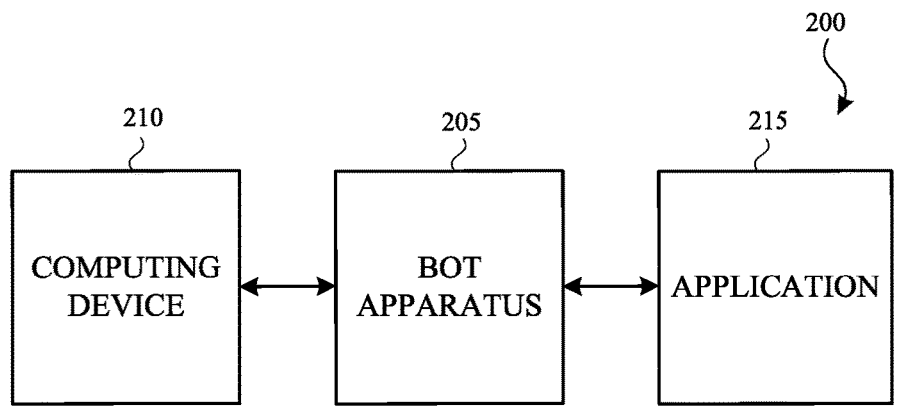
FIG. 2 is a block diagram depicting a notification system.

FIG. 2 is a block diagram depicting a notification system. The system 200 includes a bot apparatus 205 operably connected to and between a computing device 210 (e.g., client-computing device 110 in FIG. 1) and an application program 215. As described earlier, the bot apparatus 205 can be stored on a storage device and the application program 215 may be stored on the same or on a different storage device. The bot apparatus 205 and the application program 215 can each include instructions that are executed by the same or different computing devices. In one embodiment, the computing device 210 executes the bot apparatus 205 and the application program 215. Thus, the system 200 can be implemented in a single computing device or distributed in two or more computing devices.

In some embodiments, the bot apparatus 205 receives a notification from the application program 215 and responsively provides one or more interactive notification panels to the computing device 210. The notification can be a notification panel or an indication (e.g., one or more signals, data) that the application program intends to provide a notification panel to a user. If the notification is an indication, the bot apparatus produces one or more interactive notification panels. If the notification is a notification panel, the bot apparatus 205 adjusts or modifies the original notification panel to produce the interactive notification panel(s) that permits one or more user inputs to be received regarding the subject matter of the original notification panel. In some embodiments, the bot apparatus 205 transforms the original notification panel and produces one or more separate interactive notification panels when interacting with a user.

The user inputs may be received via the interactive notification panel(s). Additionally, at least one of the interactive notification panels provide one or more outputs from a bot apparatus via an interactive notification panel.

In one embodiment, the one or more interactive notification panels can be a single interactive notification panel that the bot apparatus 205 revises based on the user inputs and outputs. In another embodiment, at least one of the interactive notification panels is a separate interactive notification panel that the bot apparatus 205 produces based on a user input or an output.

Each user input can be any suitable type of a user input. For example, the user input can be a text input, a spoken (audio) input, a touch input, a gesture input, a motion input (e.g., motion of the computing device), a motion-tracking input, and the like. The interactive notification panel can be modified by the bot apparatus 205 to include one or more dialog boxes, text boxes, check boxes, buttons, popup calendar, date, and/or time pickers, pull-down or drop-down menus, graphics or images, scroll menus, forms, and other types of input elements or graphical control elements. In some embodiments, the interactive notification panel is modified to provide an output to a computing device (e.g., client-computing device 110 in FIG. 1) and to receive a user input in response to the output.

Figure 3:
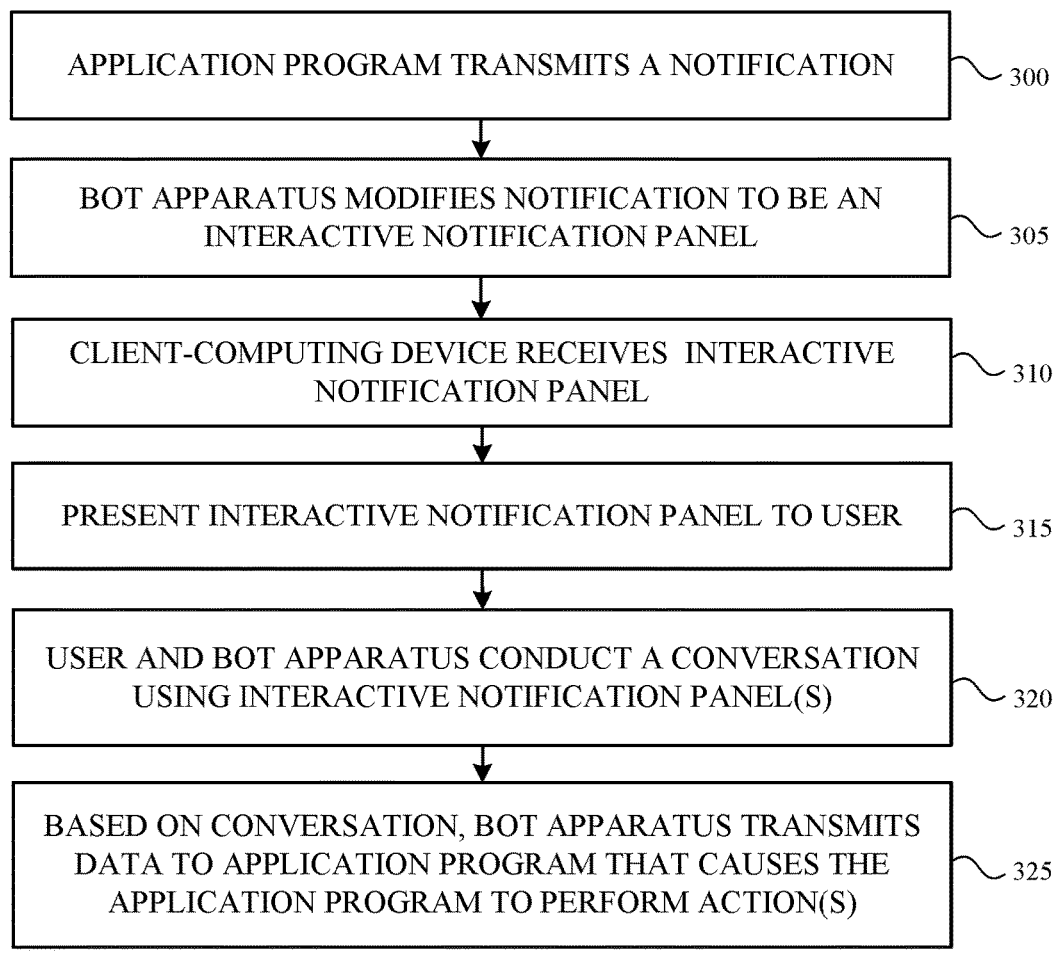
FIG. 3 is a flowchart illustrating a first example method of operating a notification system that provides interactive notification panels.

FIG. 3 is a flowchart illustrating an example method of operating a notification system that provides interactive notification panels. Initially, as shown in block 300, an application program creates or provides a notification for a user. The notification can be a notification panel or an indication (e.g., signal(s), data) that the application program intends to provide a notification panel to the user. A bot apparatus receives and modifies or transforms the notification into an interactive notification panel (block 305). The modification can include modifying an original notification panel and/or by providing one or more separate interactive notification panels. In some aspects, a separate interactive notification panel can be presented to the user concurrently, simultaneously, or overlapping in time with the original notification panel.

Next, as shown in blocks 310 and 315, a client-computing device receives the interactive notification panel and presents the interactive notification panel to the user. The user and the interactive notification panel or panels then conduct a conversation at block 320. In general, a conversation includes one or more user inputs and one or more outputs. For example, in one embodiment, the conversation is a dialogue between a machine (e.g., the client-computing device) and the user. The dialogue typically relies on turn-taking behavior. One party (e.g., the user) submits a user input (e.g., a first turn) and the machine provides an output (e.g., a second turn). This turn-taking behavior continues until the end of the dialogue.

In another example, the conversation can comprise one or more user inputs followed by one or more outputs. For example, in response to a single user input, a bot apparatus may provide two or more outputs in one or more interactive notification panels. In a non-limiting embodiment, the two or more outputs can include one interactive notification panel and a non-interactive notification panel (e.g., non-interactive notification panel provides instructions, a warning, an image).

Based on at least one user input in the conversation, the bot apparatus transmits data to the application program that causes the application program to perform one or more actions (block 325). For example, if the application program is a calendar program, the calendar program may change or delete an entry (e.g., a meeting or appointment) on the calendar based on the conversation between the bot apparatus and the user. As another example, if the application program is a social network application, the social network program can send a message to another user based on the conversation between the bot apparatus and the user.

Non-limiting examples of interactive notification panels are now described. The example interactive notification panels relate to a restaurant ordering program (FIG. 4), a cable television program (FIG. 5), and a scheduling program (FIG. 6). However, those skilled in the art will recognize that interactive notification panels regarding other subjects or applications can be provided by a notification system. In FIGS. 4-6, a user input is shown in italics and an output from a bot apparatus is underlined.

Figure 4A:
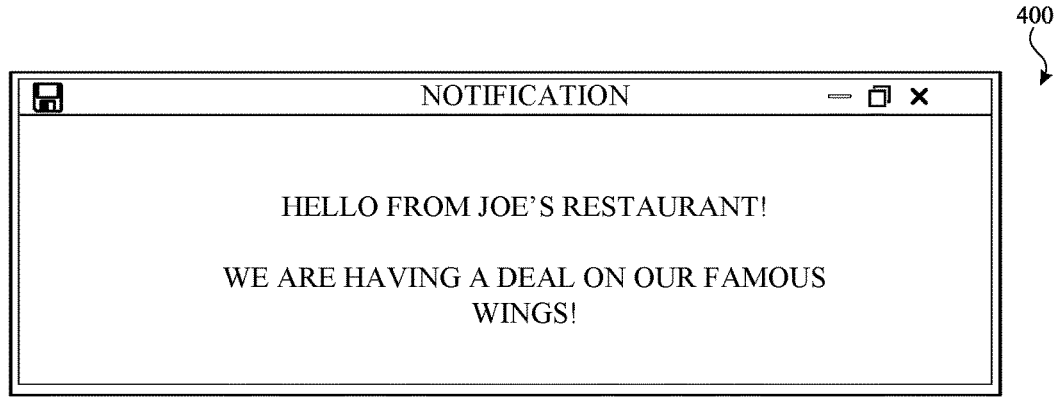
FIG. 4A depicts an original notification panel provided by an application program.

FIG. 4A depicts an original notification panel provided by an application program, and FIGS. 4B-4E depict a first example of a user interacting with one or more interactive notification panels that is based on the notification panel shown in FIG. 4A. The first example relates to a user placing an order with a restaurant ordering application using one or more interactive notification panels. FIG. 4A illustrates an original notification panel 400 that is produced by the restaurant ordering application. The original notification panel 400 is an advertisement for Joe's Restaurant and informs the user that Joe's Restaurant is having a special on wings.

Figure 4B:
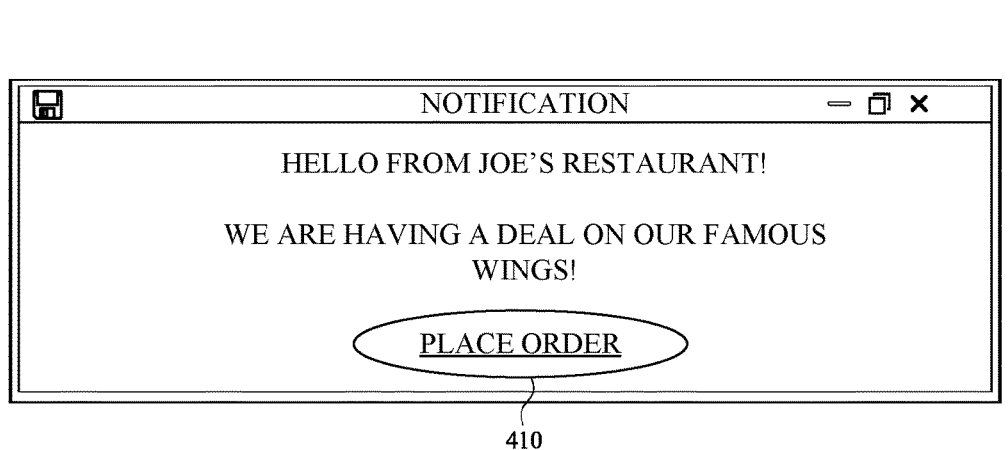
FIGS. 4B-4E depict a first example of a user interacting with one or more interactive notification panels that is based on the notification shown in FIG. 4A.
Figure 4C:
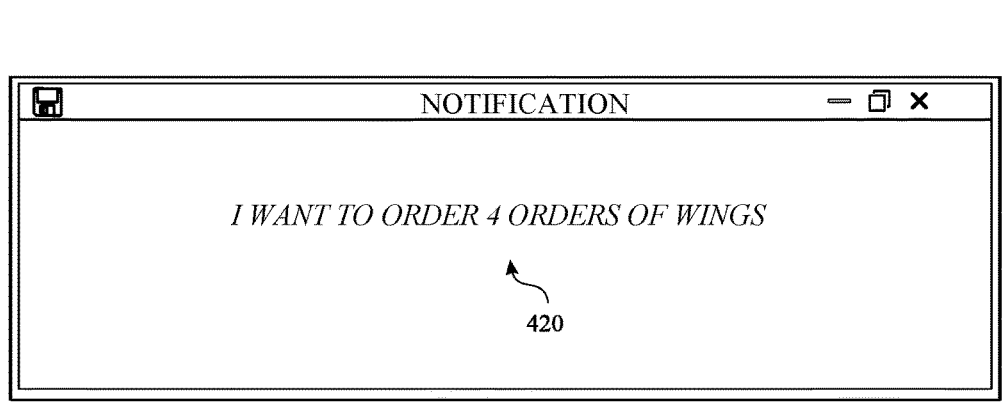

FIG. 4B depicts an interactive notification panel 405 that has been provided by a bot apparatus. The interactive notification panel 405 includes a first output 410 (e.g., a button) that a user can click or press (a first user input) to place an order with Joe's Restaurant. In response to the user clicking the first output 410, the interactive notification panel 415 allows the user to submit a second user input 420 in which he or she places an order for four orders of wings (see FIG. 4C). The second user input 420 can be any suitable type of user input, such as a text input or an audio input that is converted to a text input.

Figure 4D:
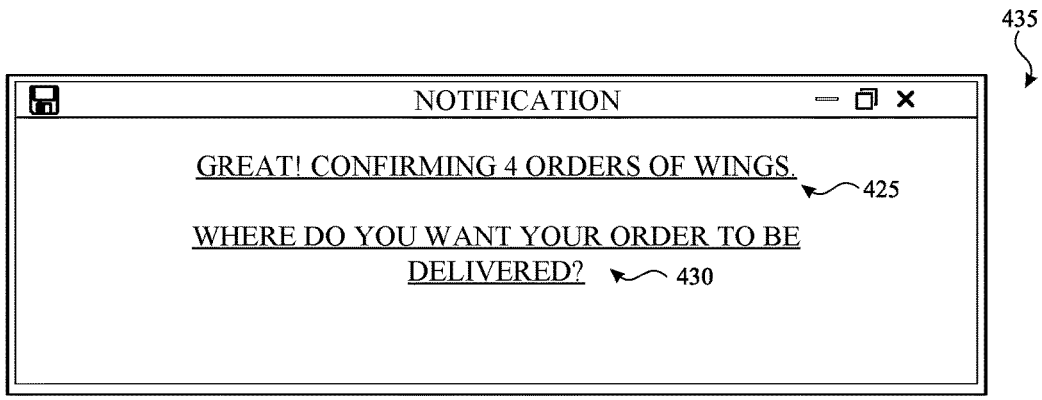
Figure 4E:
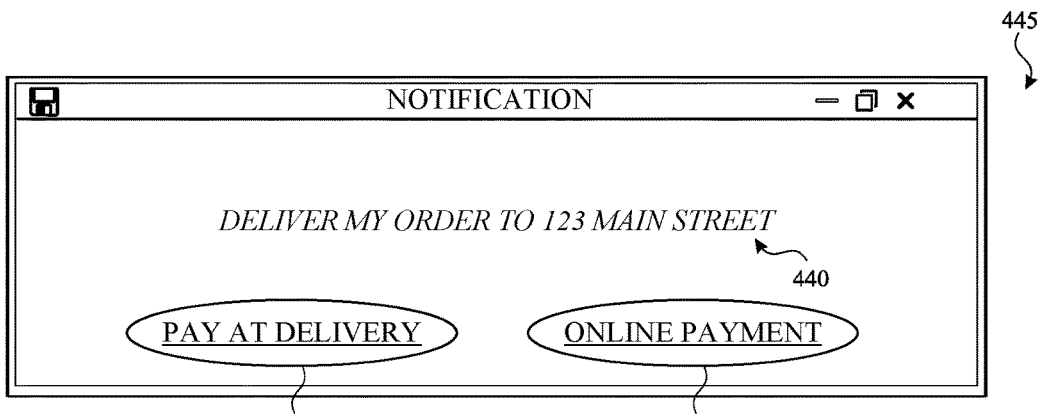

Next, as shown in FIG. 4D, second and third outputs 425, 430 are provided to the user in the interactive notification panel 435. The second output 425 is a confirmation of the second input (the wings order). The third output 430 is a query or question asking the user where he or she wants their order to be delivered. In FIG. 4E, the user submits a third user input 440 in the interactive notification panel 445. The third user input 440 provides an address for the delivery of the wings. The interactive notification panel 445 also provides fourth 450 and fifth 455 outputs that permit the user to indicate he or she will pay at delivery or will pay online, respectively. If the user selects the pay online user input (the fourth user input), the bot apparatus can provide an online payment form for the user (not shown).

The first, second, and third user inputs and the first, second, third, and fourth outputs collectively form a conversation between the user and a client-computing device (e.g., client-computing device 110 in FIG. 1). During or after the conversation, the bot apparatus can transmit data (e.g., the order, the delivery address, and if provided, the payment information) to the restaurant ordering application. Based on the received data, the restaurant ordering application will perform one or more actions. For example, one action can be the submission of the order, another action may be the submission of the delivery address, and a third action can be the submission of the payment information (when payment information is provided).

Figure 5A:
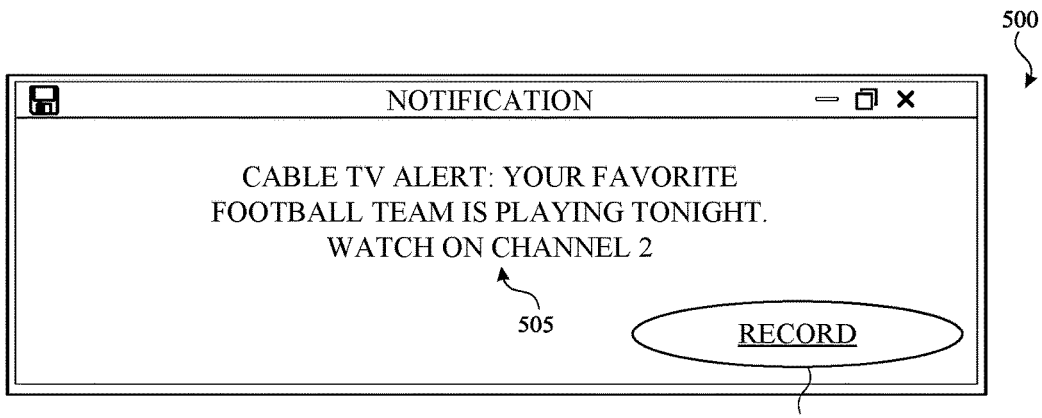
FIGS. 5A-5B illustrate a second example of a user interacting with one or more interactive notification panels.
Figure 5B:
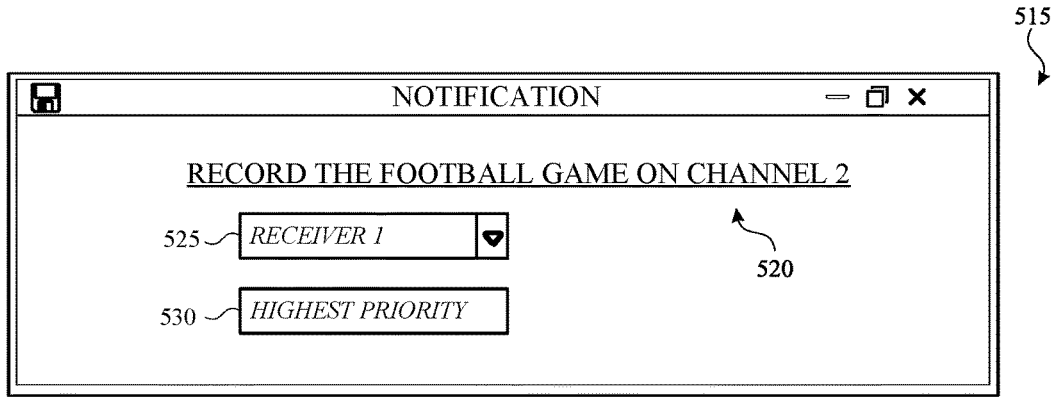

FIGS. 5A-5B depict a second example of a user interacting with one or more interactive notification panels. The second example relates to a user requesting a sporting event be recorded using one or more interactive notification panels. The original alert notification panel (not shown) provided by the cable television application informed the user that his or her favorite football team is playing that night and that he or she can watch the game on channel 2.

FIG. 5A depicts an interactive notification panel 500 that is provided by a bot apparatus based on the original notification panel. The interactive notification panel 500 includes the information from the original notification panel (see 505) and includes a button 510 the user can click if he or she wants to record the game. FIG. 5B illustrates an interactive notification panel 515 that is presented in response to the user clicking the button 510 (the first user input).

The interactive notification panel 515 provides a first output 520 that confirms the football game on channel 2 will be recorded. The interactive notification panel 515 also provides a drop-down menu 525 that allows the user to select which receiver is to record the football game. For example, a user that has a first receiver in the living room and a second receiver in the bedroom can select the first receiver to record the football game using the drop-down menu 525.

In addition to the drop-down menu 525, the interactive notification panel 515 presents a dialog box 530 that allows the user to indicate a priority for the recording. In the illustrated embodiment, the user has indicated the football game has the highest priority. If there is a conflict between recording the football game and recording another show that is broadcast at the same time, the football game will be recorded because it has been given the highest priority by the user.

During or after the illustrated conversation, the bot apparatus can transmit data (e.g., the order to record the football game, the selected receiver, and the priority) to the cable television application. Based on the received data, the cable television application will perform one or more actions. For example, one action schedules the football game to be recorded, another action identifies which receiver is to record the football game, a third action sets the priority for the football game recording, and a fourth action records the football game on the selected receiver when the football game is broadcast by the cable television company.

FIGS. 6A-6E illustrate a third example of a user interacting with one or more interactive notification panels. The third example relates to a user scheduling an appointment for a haircut with an online scheduling application using one or more interactive notification panels. The original notification panel (not shown) provided by the scheduling program of Sleek Hair Salon informed the user that it has been six weeks since their last appointment.

Figure 6A:
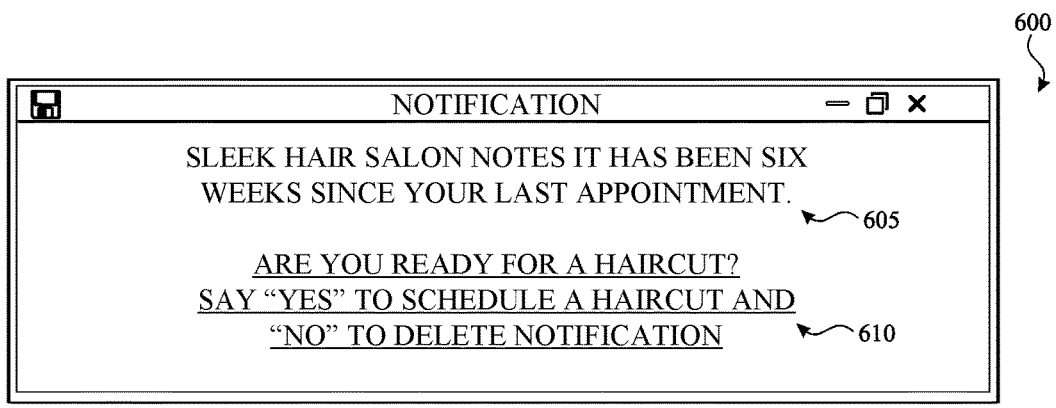
FIGS. 6A-6E depict a third example of a user interacting with one or more interactive notification panels.
Figure 6B:
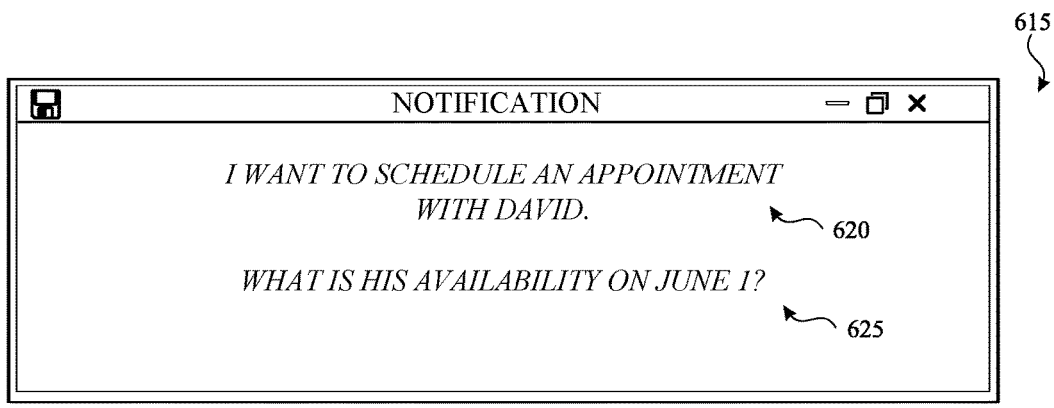

FIG. 6A depicts an interactive notification panel 600 that has been provided by a bot apparatus. The interactive notification panel 600 includes the information from the original notification 605 and adds a first output 610. The first output 610 includes a question as to whether the user is ready for a haircut and an instruction to say "yes" to schedule an appointment for a haircut and "no" to delete the notification panel 600. FIG. 6B illustrates an interactive notification panel 615 that is presented in response to the user submitting an audio response of "yes" (a first user input). In FIG. 6B, the user has submitted a second user input 620 that indicates the user wants to schedule an appointment with David. A third user input 625 is a query provided by the user, where the user asks about David's availability on June $1^{st}$.

Figure 6C:
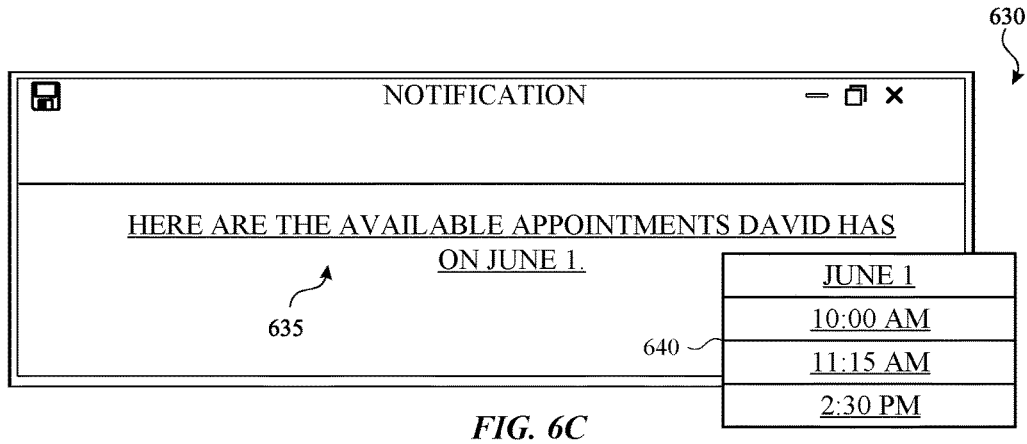

FIG. 6C depicts an interactive notification panel 630 that is presented to the user in response to his or her query regarding David's availability. A second output 635 informs the user that David's availability is being provided and a third output 640 is a separate interactive notification panel that includes graphic or image showing the appointments on June $1^{st}$ in which David is available.

Figure 6D:
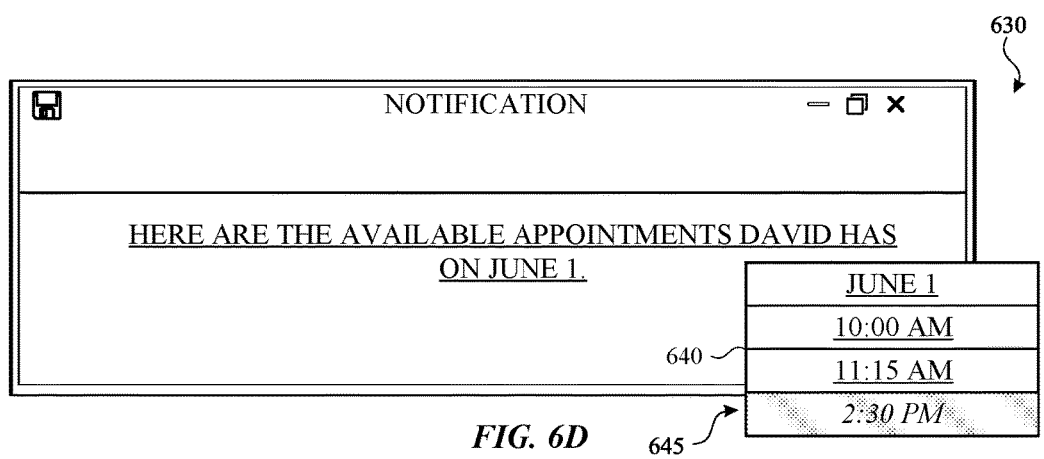

A fourth user input 645 is submitted by the user in the separate interactive notification panel 640 (see FIG. 6D). In particular, the fourth user input 645 is the selection by the user of a particular available appointment (selection represented by cross-hatching) in the interactive notification panel 640. The fourth user input 645 specifies the time at which the user wants to schedule his or her appointment (at 2:30 pm). The user can select an available appointment using any suitable technique. For example, the user may use a cursor control device (e.g., a mouse) to select the appointment or the user can touch a touchscreen display with a stylus or finger to select the appointment.

Figure 6E:
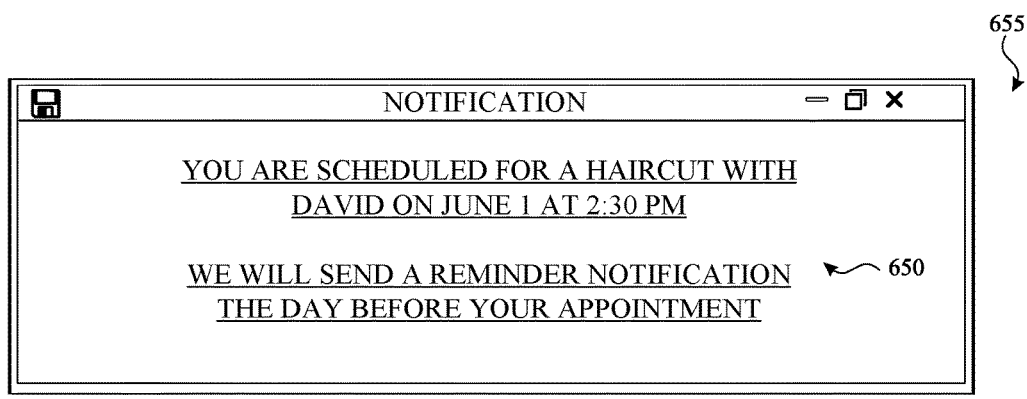

In FIG. 6E, a fourth output 650 is presented to the user in the interactive notification panel 655. The fourth output 650 confirms the date and time of the scheduled appointment with David and informs the user that a reminder notification will be sent to the user the day before the appointment.

In this representative embodiment, the bot apparatus transmits data (e.g., the request for the appointment, the request for available appointments, and the selected appointment) to the online scheduling application during the conversation. Based on the received data, the scheduling application will perform one or more actions. For example, one action is to schedule the appointment on David's calendar at the selected time on the requested date.

The various interactive notification panels illustrated in each of FIGS. 4-6 can represent the same interactive panel or separate interactive panels. For example, the interactive notification panels 405, 415, 435, 445 in FIG. 4 can each be separate interactive notification panels or a single interactive notification panel that the bot apparatus revises based on a user input or an output. In FIG. 5, the interactive notification panels 500, 515 may each be separate interactive notification panels or a single interactive notification panel that the bot apparatus modifies based on a user input or an output. In FIG. 6, the interactive notification panel 640 is separate from the interactive notification panel 630. However, the other interactive notification panels in FIG. 6 (e.g., interactive notification panels 600, 615, 630, 655) can each be separate interactive notification panels or a single interactive notification panel that the bot apparatus revises based on a user input or an output.

Figure 7:
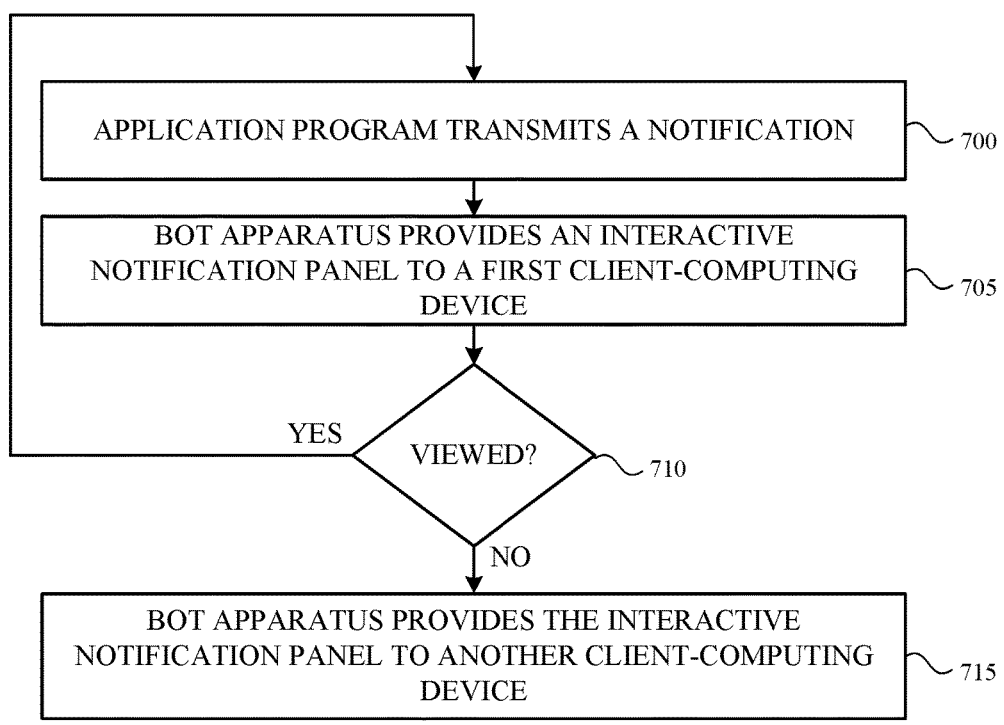
FIG. 7 illustrates a second example method of operating a notification system that provides interactive notification panels.

FIG. 7 illustrates a second example method of operating a notification system that provides interactive notification panels. Initially, as shown in block 700, an application program creates or provides a notification for a user. As described earlier, the notification can be a notification panel or an indication (e.g., signal(s), data) that the application program intends to provide a notification panel to the user. A bot apparatus receives and modifies or transforms the notification into an interactive notification panel that is provided to a first client-computing device (block 705). In one non-limiting example, the first client-computing device is a user-specified preferred client-computing device for receiving interactive notification panels. The user may use any suitable technique for specifying a client-computing device as the preferred client-computing device. For example, the application program can permit a user to prioritize his or her client-computing devices to receive notifications.

In another non-limiting example, a bot apparatus can learn over time which client-computing devices a user uses to view particular interactive notification panels and send the interactive notification panels to those client-computing devices. In one embodiment, a bot apparatus may use machine learning algorithms and processes (e.g., one or more neural networks) to learn or predict which client-computing device a user will use to view interactive notification panels associated with an application program. For example, a user may view interactive notification panels associated with a calendar program on a desktop computing device at work and view interactive notification panels associated with a restaurant ordering program on a mobile computing-device (e.g., a smart phone). In this example, the bot apparatus may identify the desktop computing device as a preferred client-computing device for the interactive notification panels associated with the calendar program and the mobile computing device as a preferred client-computing device for the interactive notification panels associated with the restaurant ordering program.

Returning to FIG. 7, after the interactive notification panel has been sent to the first client-computing device, the bot apparatus can determine whether the interactive notification panel has been viewed on the first device (block 710). If the interactive notification panel has been viewed, the process returns to block 700 to wait for the next notification from an application program. If the interactive notification panel has not been viewed, the method continues at block 715 where the bot apparatus sends another interactive notification panel to a different client-computing device. For example, a user may regularly view interactive notification panels from a calendar program on a desktop computing device and occasionally on a mobile computing device. In such embodiments, the bot apparatus can send an interactive notification panel to the desktop computing device at block 705 and to the mobile computing device at block 715.

Figure 8:
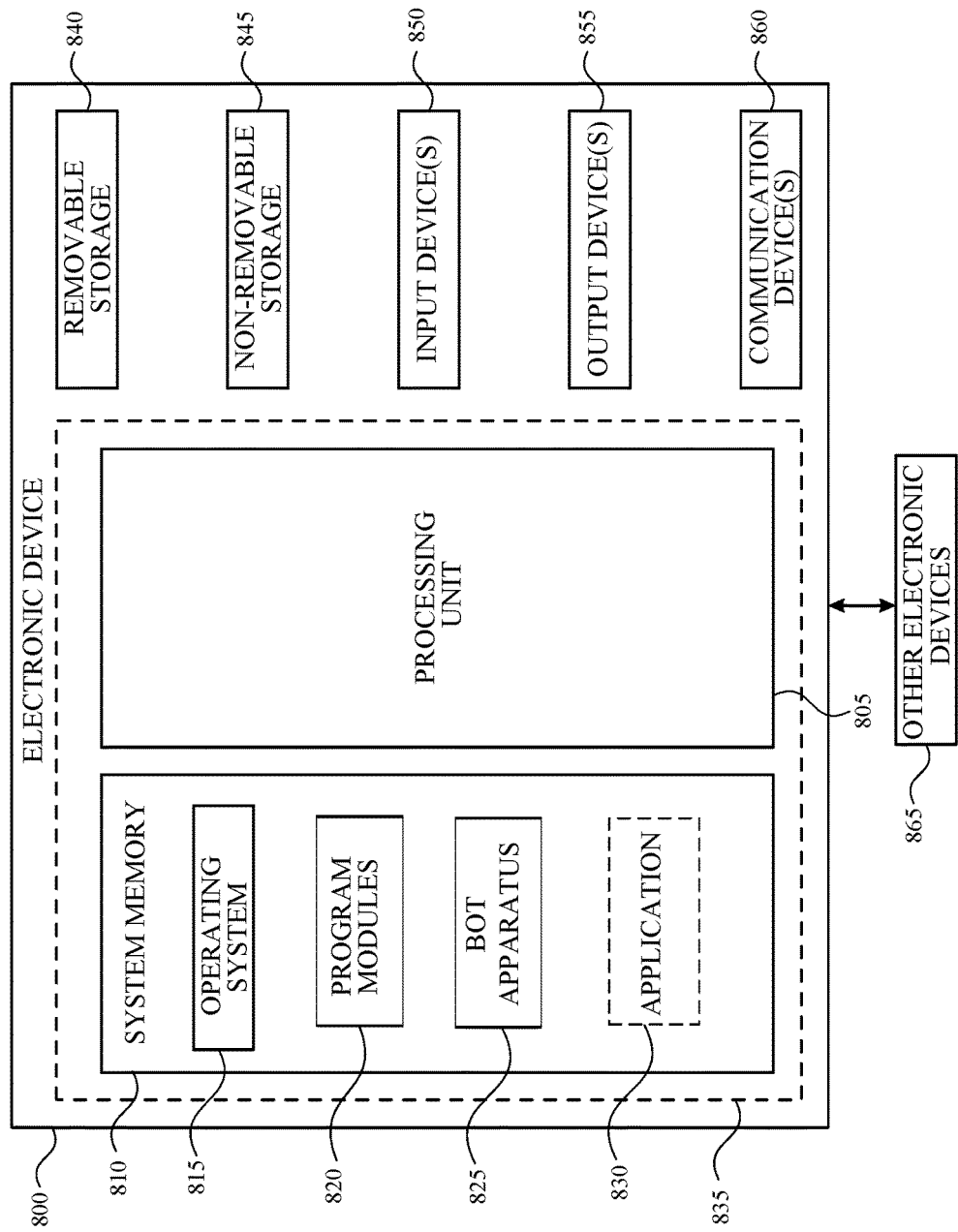
FIG. 8 is a block diagram depicting example physical components of an electronic device with which aspects of the disclosure may be practiced.
Figure 9A:
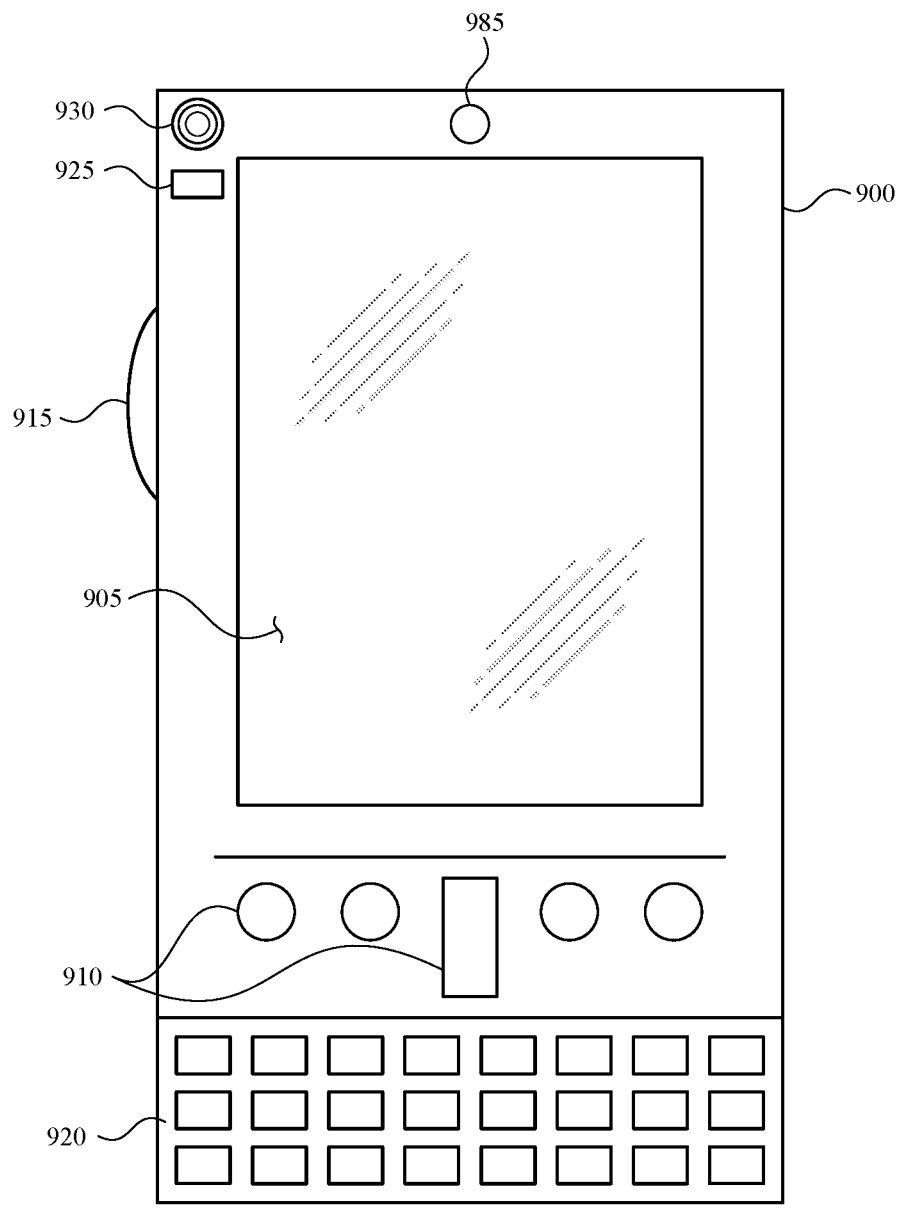
FIGS. 9A-9B are simplified block diagrams illustrating a mobile computing device with which aspects of the present disclosure may be practiced.
Figure 9B:
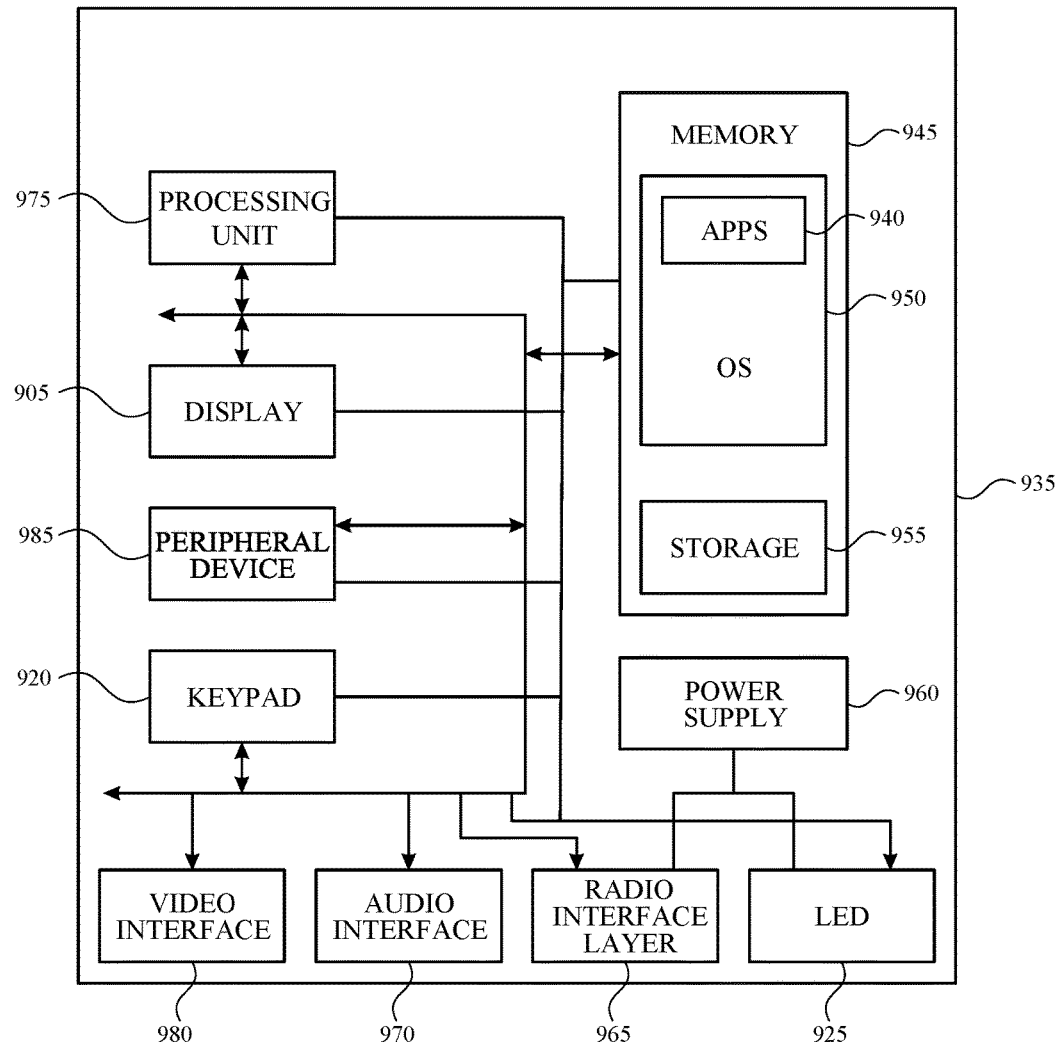
Figure 10:
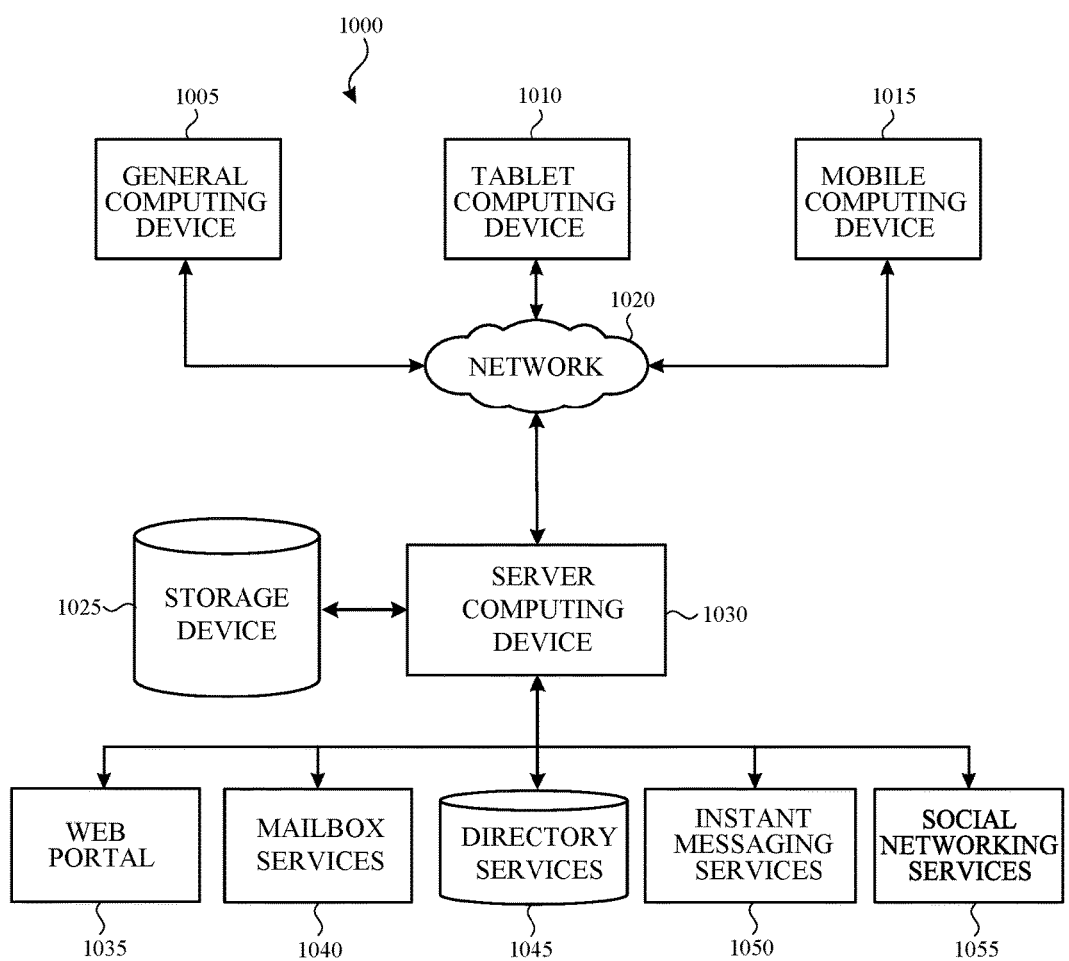
FIG. 10 is a block diagram of a distributed computing system in which aspects of the present disclosure may be practiced.

FIGS. 8-10 and the associated descriptions provide a discussion of a variety of operating environments in which aspects of the disclosure may be practiced. However, the devices and systems illustrated and discussed with respect to FIGS. 8-10 are for purposes of example and illustration and are not limiting of a vast number of electronic device configurations that may be utilized for practicing aspects of the disclosure, as described herein.

FIG. 8 is a block diagram illustrating physical components (e.g., hardware) of an electronic device 800 with which aspects of the disclosure may be practiced. The components described below may be suitable for the computing devices described above, including the client-computing device 110 and/or the server-computing device 125 in FIG. 1.

In a basic configuration, the electronic device 800 may include at least one processing unit 805 and a system memory 810. Depending on the configuration and type of the electronic device, the system memory 810 may comprise, but is not limited to, volatile storage (e.g., random access memory), non-volatile storage (e.g., read-only memory), flash memory, or any combination of such memories. The system memory 810 may include a number of program modules and data files, such as an operating system 815, one or more program modules 820 suitable for parsing received input, determining subject matter of received input, determining actions associated with the input and so on, one or more bot apparatuses 825, and one or more optional applications 830 that interact with at least one of the one or more bot apparatuses 825. While executing on the processing unit 805, each bot apparatus 825 may perform and/or cause to be performed processes including, but not limited to, the aspects as described herein.

The operating system 815, for example, may be suitable for controlling the operation of the electronic device 800. Furthermore, embodiments of the disclosure may be practiced in conjunction with a graphics library, other operating systems, or any other application program and is not limited to any particular application or system. This basic configuration is illustrated in FIG. 8 by those components within a dashed line 835.

The electronic device 800 may have additional features or functionality. For example, the electronic device 800 may also include additional data storage devices (removable and/or non-removable) such as, for example, magnetic disks, optical disks, or tape. Such additional storage is illustrated in FIG. 8 by a removable storage device 840 and a non-removable storage device 845.

The electronic device 800 may also have one or more input device(s) 850 such as a keyboard, a trackpad, a mouse, a pen, a sound or voice input device, a touch, force and/or swipe input device, etc. The output device(s) 855 such as a display, speakers, a printer, etc. may also be included. The aforementioned devices are examples and others may be used. The electronic device 800 may include one or more communication devices 860 allowing communications with other electronic devices 865. In some instances, the communications with other electronic devices can permit one or more bot apparatuses 825 to interface with an application program that is executing on at least one of the other electronic devices 865. Examples of suitable communication devices 860 include, but are not limited to, radio frequency (RF) transmitter, receiver, and/or transceiver circuitry, a universal serial bus (USB), and/or parallel and/or serial ports.

The term computer-readable media or storage device as used herein may include computer storage media or devices. Computer storage media may include volatile and nonvolatile, removable and non-removable media implemented in any method or technology for storage of information, such as computer readable instructions, data structures, or program modules.

The system memory 810, the removable storage device 840, and the non-removable storage device 845 are all computer storage media examples (e.g., memory storage or storage devices). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the electronic device 800. Any such computer storage media may be part of the electronic device 800. Computer storage media does not solely include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 8 may be integrated onto a single integrated circuit. Such an SOC device may include one or more processing units, graphics units, communications units, system virtualization units and various application functionality all of which are integrated (or "burned") onto the chip substrate as a single integrated circuit.

When operating via an SOC, the functionality described herein may be operated via application-specific logic integrated with other components of the electronic device 800 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

FIGS. 9A-9B illustrate a mobile electronic device 900, for example, a mobile telephone, a smart phone, wearable computer (such as a smart watch), a tablet computer, a laptop computer, and the like, with which embodiments of the disclosure may be practiced. With reference to FIG. 9A, one aspect of a mobile electronic device 900 for implementing the aspects is illustrated. The components described below may be suitable for the computing devices described above, including the client-computing device 110 in FIG. 1.

In a basic configuration, the mobile electronic device 900 is a handheld computer having both input elements and output elements. The mobile electronic device 900 typically includes a display 905 and one or more input buttons 910 that allow the user to enter information into the mobile electronic device 900. The display 905 of the mobile electronic device 900 may also function as an input device (e.g., a display that accepts touch and/or force input).

If included, an optional side input element 915 allows further user input. The side input element 915 may be a rotary switch, a button, or any other type of manual input element. In alternative aspects, mobile electronic device 900 may incorporate more or less input elements. For example, the display 905 may not be a touch screen in some embodiments. In yet another alternative embodiment, the mobile electronic device 900 is a portable phone system, such as a cellular phone. The mobile electronic device 900 may also include an optional keypad 920. Optional keypad 920 may be a physical keypad or a "soft" keypad generated on the touch screen display.

In various embodiments, the output elements include the display 905 for showing a graphical user interface (GUI) and a set of available templates, a visual indicator 925 (e.g., a light emitting diode), and/or an audio transducer 930 (e.g., a speaker). In some aspects, the mobile electronic device 900 incorporates a vibration transducer for providing the user with tactile feedback. In yet another aspect, the mobile electronic device 900 incorporates input and/or output ports, such as an audio input (e.g., a microphone jack), an audio output (e.g., a headphone jack), and a video output (e.g., a HDMI port) for sending signals to or receiving signals from an external device.

FIG. 9B is a block diagram illustrating the architecture of one aspect of a mobile electronic device 900. That is, the mobile electronic device 900 can incorporate a system (e.g., an architecture) 935 to implement some aspects. In one embodiment, the system 935 is implemented as a "smart phone" capable of running one or more applications (e.g., browser, e-mail, calendaring, contact managers, messaging clients, games, media clients/players, content selection and sharing applications and so on). In some aspects, the system 935 is integrated as an electronic device, such as an integrated personal digital assistant (PDA) and wireless phone.

One or more application programs 940 may be loaded into the memory 945 and run on or in association with the operating system 950. Examples of the application programs include phone dialer programs, e-mail programs, personal information management (PIM) programs, word processing programs, spreadsheet programs, Internet browser programs, messaging programs, and so forth.

The system 935 also includes a non-volatile storage area 955 within the memory 945. The non-volatile storage area 955 may be used to store persistent information that should not be lost if the system 935 is powered down.

The application programs 940 may use and store information in the non-volatile storage area 955, such as electronic communications, calendars, images, audio, video, documents, and the like. A synchronization application (not shown) also resides on the system 935 and is programmed to interact with a corresponding synchronization application resident on a host computer to keep the information stored in the non-volatile storage area 955 synchronized with corresponding information stored at the host computer.

The system 935 has a power supply 960, which may be implemented as one or more batteries. The power supply 960 may further include an external power source, such as an AC adapter or a powered docking cradle that supplements or recharges the batteries.

The system 935 may also include a radio interface layer 965 that performs the function of transmitting and receiving radio frequency communications. The radio interface layer 965 facilitates wireless connectivity between the system 935 and the "outside world," via a communications carrier or service provider. Transmissions to and from the radio interface layer 965 are conducted under control of the operating system 950. In other words, communications received by the radio interface layer 965 may be disseminated to the application programs 940 via the operating system 950, and vice versa.

The visual indicator 925 may be used to provide visual notifications, and/or an audio interface 970 may be used for producing audible notifications via an audio transducer (e.g., audio transducer 930 illustrated in FIG. 9A). In the illustrated embodiment, the visual indicator 925 is a light emitting diode (LED) and the audio transducer 930 may be a speaker. These devices may be directly coupled to the power supply 960 so that when activated, they remain on for a duration dictated by the notification mechanism even though the processing unit 975 and other components might shut down for conserving battery power. The LED may be programmed to remain on indefinitely until the user takes action to indicate the powered-on status of the device.

The audio interface 970 is used to provide audible signals to and receive audible signals from the user (e.g., voice input such as described above). For example, in addition to being coupled to the audio transducer 930, the audio interface 970 may also be coupled to a microphone to receive audible input, such as to facilitate a telephone conversation. In accordance with embodiments of the present disclosure, the microphone may also serve as an audio sensor to facilitate control of notifications, as will be described below.

The system 935 may further include a video interface 980 that enables an operation of peripheral device 985 (e.g., on-board camera) to record still images, video stream, and the like.

A mobile electronic device 900 implementing the system 935 may have additional features or functionality. For example, the mobile electronic device 900 may also include additional data storage devices (removable and/or non-removable) such as, magnetic disks, optical disks, or tape. Such additional storage is illustrated in FIG. 9B by the non-volatile storage area 955.

FIG. 10 is a block diagram illustrating a distributed system in which aspects of the disclosure may be practiced. The system 1000 allows a bot apparatus to interface or interact with a user through a general computing device 1005 (e.g., a desktop computer), a tablet computing device 1010, and/or a mobile computing device 1015. The general computing device 1005, the tablet computing device 1010, and the mobile computing device 1015 can each include the components shown in the electronic device of FIG. 8 and/or FIGS. 9A-9B.

The general computing device 1005, the tablet computing device 1010, and the mobile computing device 1015 are each configured to access one or more networks (represented by network 1020) to interact with one or more bot apparatuses and/or one or more applications or programs stored on one or more storage devices (represented by storage device 1025) and executed on one or more server-computing devices (represented by server-computing device 1030).

In some aspects, the server-computing device 1030 can access, transmit, and/or receive various types of data from other sources, such as a web portal 1035, mailbox services 1040, a directory service 1045, instant messaging services 1050, and/or social networking services 1055. The web portal 1035, the mailbox services 1040, the directory service 1045, the instant messaging services 1050, and/or the social networking services 1055 can interface with one or more bot apparatuses to produce interactive notification panels. In some instances, these sources may provide robust reporting, analytics, data compilation and/or storage service, etc., whereas other services may provide search engines or other access to data and information, images, videos, document processing and the like.

As should be appreciated, FIGS. 8-9 are described for purposes of illustrating the present methods and systems and is not intended to limit the disclosure to a particular sequence of steps or a particular combination of hardware or software components.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

The invention claimed is:

1. A system, comprising:
one or more processors; and
one or more storage devices for storing instructions that when executed by the one or more processors, cause the system to perform a method, comprising:
receiving, by an intelligent virtual assistant, a notification from an application program;
transforming, by the intelligent virtual assistant, the notification into a first interactive notification panel that comprises one or more first outputs configured to receive one or more user inputs;
receiving, by the intelligent virtual assistant, a spoken user input responsive to at least one of the one or more first outputs, the spoken user input comprising input data for an action to be performed by the application program;
transmitting, by the intelligent virtual assistant, a second interactive notification panel in response to the spoken user input, the second interactive notification panel comprising a confirmation of the spoken user input and one or more second outputs configured to receive one or more user inputs, wherein content in the second interactive notification panel is distinct from content in the first interactive notification panel;
receiving, by the intelligent virtual assistant, a second user input responsive to at least one of the one or more second outputs, the second user input comprising second input data for the application program, wherein collectively the first interactive notification panel, the spoken user input, the second interactive notification panel, and the second user input comprise a dialogue; and
transmitting, by the intelligent virtual assistant, the input data to the application program to enable the application to perform the action.

2. The system of claim 1, wherein the intelligent virtual assistant is stored on a first storage device and executed by a first computing device and the application program is stored on a second storage device and executed by a second computing device.

3. The system of claim 2, wherein the first computing device and the second computing device is a same computing device.

4. The system of claim 2, wherein the first computing device comprises a first server-computing device and the second computing device comprises one of a second server-computing device or a client-computing device.

5. A method for providing one or more interactive notifications, the method comprising:
receiving, by an intelligent virtual assistant, a notification from an application program;

transforming, by the intelligent virtual assistant, the notification into a first interactive notification panel that is configured to receive a first user input;
providing, by the intelligent virtual assistant, the first interactive notification panel to a client-computing device;
based on receipt of the first user input associated with the first interactive notification panel, providing, by the intelligent virtual assistant, a second interactive notification panel to the client computing device, the second interactive notification panel configured to receive a second user input and comprising a confirmation of the first user input, wherein content in the second interactive notification panel is distinct from content in the first interactive notification panel;
receiving, by the intelligent virtual assistant, the second user input associated with the second interactive panel, the second user input comprising input data for the application program, wherein collectively the first interactive notification panel, the first user input, the second interactive notification panel, and the second user input comprise a dialogue between the intelligent virtual assistant and the client-computing device; and
transmitting, by the intelligent virtual assistant, the input data to the application program to enable the application program to perform an action associated with the application program.

6. The method of claim 5, wherein the first user input comprises a text input.

7. The method of claim 5, wherein the first user input comprises a spoken input.

8. The method of claim 5, wherein the operation of providing the first interactive notification panel to the client-computing device causes the first interactive notification panel to be presented on a display.

9. The method of claim 5, wherein the operation of providing the first interactive notification panel to the client-computing device causes the first interactive notification panel to be provided to one or more speakers.

10. The method of claim 5, wherein the operation of transforming, by the intelligent virtual assistant, the notification into the first interactive notification panel comprises modifying, by the intelligent virtual assistant, a notification panel to include one or more graphical control elements.

11. A method for providing one or more interactive notifications, the method comprising:
receiving, by an intelligent virtual assistant, a notification from an application program;
transforming, by the intelligent virtual assistant, the notification into a first interactive notification panel comprising a first output configured to receive a first user input;
providing, by the intelligent virtual assistant, the first interactive notification panel to a client-computing device to present the first interactive notification panel to a user using an output device;
receiving, by the intelligent virtual assistant, a first user input responsive to the first output, the first user input comprising first input data for the application program;
transmitting, by the intelligent virtual assistant, a second interactive notification panel to the client-computing device in response to the first user input, the second interactive notification panel comprising a confirmation of the first user input and a second output configured to receive a second user input, wherein content in the second interactive notification panel is distinct from content in the first interactive notification panel;
receiving, by the intelligent virtual assistant, the second user input comprising second input data for the application program, wherein collectively the first interactive notification panel, the first user input, the second interactive notification panel, and the second user input comprise a dialogue between the intelligent virtual assistant and the client-computing device; and
transmitting, by the intelligent virtual assistant, the first and the second input data to the application program to enable the application program to perform an action associated with the application program.

12. The method of claim 11, wherein the second user input comprises a touch input or a gesture input.

13. The method of claim 11, wherein the output device comprises one or more speakers.

14. The method of claim 13, wherein the first output is provided to the one or more speakers.

15. The method of claim 11, wherein the intelligent virtual assistant is stored on a first storage device and executed by a first server-computing device and the application program is stored on a separate second storage device and executed by a separate second server-computing device.

16. The method of claim 11, wherein the operation of transforming, by the intelligent virtual assistant, the notification into the interactive notification panel comprises modifying, by the intelligent virtual assistant, a notification panel to include one or more graphical control elements, at least one of the one or more graphical control elements comprising a dialog box.

17. The method of claim 11, wherein:
the client-computing device comprises a first client-computing device;
the output device comprises a first output device; and
the method further comprises:
prior to receiving the second user input, determining, by the intelligent virtual assistant, if the second interactive notification panel has been viewed at the first client-computing device; and
when the second interactive notification panel has not been viewed, transmitting, by the intelligent virtual assistant, the second interactive notification panel to a second client-computing device to present the second interactive notification panel to the user using a second output device.

18. The method of claim 11, wherein the first user input comprises a spoken user input.

19. The method of claim 18, wherein the confirmation comprises a confirmation of the spoken user input.

* * * * *